(12) United States Patent
Yuksel

(10) Patent No.: US 10,259,497 B2
(45) Date of Patent: Apr. 16, 2019

(54) JOINT SYSTEM

(71) Applicant: Ergin Yuksel, Istanbul (TR)

(72) Inventor: Ergin Yuksel, Istanbul (TR)

(*) Notice: Subject to any disclaimer, the term of this patent is extended or adjusted under 35 U.S.C. 154(b) by 0 days.

(21) Appl. No.: 15/748,389

(22) PCT Filed: Jul. 29, 2016

(86) PCT No.: PCT/TR2016/000106
§ 371 (c)(1),
(2) Date: Jan. 29, 2018

(87) PCT Pub. No.: WO2017/023216
PCT Pub. Date: Feb. 9, 2017

(65) Prior Publication Data
US 2018/0257705 A1    Sep. 13, 2018

(30) Foreign Application Priority Data
Aug. 5, 2015 (TR) .............................. a 2015 09688

(51) Int. Cl.
*B62D 7/06* (2006.01)
*B62D 7/18* (2006.01)

(52) U.S. Cl.
CPC ............... *B62D 7/06* (2013.01); *B62D 7/18* (2013.01)

(58) Field of Classification Search
CPC ..................................... B62D 7/06; B62D 7/18
See application file for complete search history.

(56) References Cited

U.S. PATENT DOCUMENTS

| 3,342,507 | A | * | 9/1967 | Koch | ....................... | B62D 7/18 |
| | | | | | | 280/86.754 |
| 10,005,494 | B2 | * | 6/2018 | Fink | ....................... | B62D 17/00 |
| 2008/0240847 | A1 | * | 10/2008 | Crouse | .................. | B62D 7/166 |
| | | | | | | 403/122 |

(Continued)

FOREIGN PATENT DOCUMENTS

| JP | 03167078 A | 7/1991 |
| JP | 2008222057 A | 9/2008 |
| WO | 2005068278 A1 | 7/2005 |

OTHER PUBLICATIONS

International Search Report and Written Opinion for corresponding PCT application No. PCT/TR2016/000106, dated Feb. 28, 2017.
(Continued)

*Primary Examiner* — James A English
(74) *Attorney, Agent, or Firm* — Notaro, Michalos & Zaccaria P.C.

(57) ABSTRACT

A joint system for controlling maneuvering of the front wheels of a road vehicle. The joint system has a hollow joint body suitable for connecting to the chassis of a road vehicle and a body opening on a side surface thereof. A rod arm is connected to the joint body such that it is rotationally moved on a first rotation axis and has a rod arm body in the form of a ring, an arm and a rod arm gear in the form of a ring gear. An eccentric bearing member bears the rod arm body in the joint body. An axle is connected to at least one wheel shaft extending outward from the body opening and has an axle body located in the joint body and rotates on a second rotation axis parallel to the said first rotation axis.

10 Claims, 6 Drawing Sheets

(56) References Cited

U.S. PATENT DOCUMENTS

2016/0229249 A1* 8/2016 Mori ........................ B62D 7/18
2017/0341682 A1* 11/2017 Shan ........................ B62D 7/20

OTHER PUBLICATIONS

International Preliminary Examination Report for corresponding PCT application No. PCT/TR2016/000106, dated Jul. 12, 2016.
International Preliminary Examination Report for corresponding PCT application No. PCT/TR2016/000106, dated Jul. 12, 2017.

* cited by examiner

JOINT SYSTEM

RELEVANT FIELD OF ART

The present invention relates to joint systems for controlling maneuvering of the front wheels of the road vehicles.

BACKGROUND ART

In general, maneuvering of road vehicles such as turning to the right/left is achieved by changing position of the front wheels. This position change of the front wheels is achieved by means of joint systems. Said joint systems comprise at least one rod arm that moves the wheels, at least one rod bar that moves the said rod arm, and at least one intermediate shaft that transmits the rotational movement of the steering wheel to the rod bar. Said rod arm is connected, at one end, to the vehicle chassis such that it is movable thereon and at the other end, is connected to the wheel by means of a wheel shaft. Moving the rod arm with respect to the chassis by means of the rod bar results in that the wheel connected to the rod arm is also moved with respect to the chassis so that the vehicle is allowed to maneuver.

The rotation angle of the rod arm is restricted by a connection between the rod arm and rod bar. When the angle between the rod arm and the rod bar is above a certain obtuse angle or below a certain acute angle, such problems may be experienced as locking of the rod arm and/or reverse rotation thereof. Said obtuse angle and acute angle values of the rod arm also result in a restriction in the rotation angle of the wheel associated with the rod arm. This reduces maneuverability of the road vehicle.

WO2005068278A1 discloses a vehicle wherein the rotation angle of the front wheels is increased. In the said vehicle, with a customization of the connection of the rod arm and the rod bar, the difference between the obtuse angle and acute angle values of the rod arm is increased. Thus, the rotation angles of the vehicle's wheels are also increased. However, in the system disclosed in WO2005068278A1, since the movement transmission between the rod arm and the wheel is one-to-one (i.e. the rotation angles of the rod arm and the wheel is the same), such problems as locking of the rod arm may also be seen in the said system.

BRIEF DESCRIPTION OF THE INVENTION

With the present invention, there is provided a joint system for controlling maneuvering of the front wheels of a road vehicle. Said joint system comprises at least one hollow joint body suitable for connecting to the chassis of a road vehicle by means of a chassis connection and having at least one body opening on a side surface thereof; at least one rod arm which has at least one rod arm body in the form of a ring, at least one arm protruding from the rod arm body and at least one rod arm gear, in the form of a ring gear, located inside the rod arm body, and which is connected to the said joint body such that it is rotationally moved on a first rotation axis; at least one eccentric bearing member located in the joint body and bearing the rod arm body in the joint body such that it rotates on the said first rotation axis; at least one axle which is connected to at least one wheel shaft extending outward from the said body opening and comprises at least one axle body which is located in the joint body such that it rests on the bottom portion of the joint body and rotates, in the joint body, on a second rotation axis parallel to the said first rotation axis and at least one axle gear which is located on the said axle body and is in contact with the said rod arm gear that allows the rod arm to rotate on the first rotation axis and the axle body to rotate on the second rotation axis.

In the joint system according to the present invention, since the rod arm and the axle are moved on different rotation axes and the number of teeth of the rod arm gear and that of the axle gear is adjusted, the rod arm and the axle are rotated at varying degrees. Thus, the rotation angle of the axle, of the wheel shaft connected to the axle and of a wheel connected to the wheel shaft is prevented from being restricted by the rotation angle of the rod arm, so that the maneuverability of the road vehicle employing the joint system is increased.

OBJECT OF THE INVENTION

An object of the present invention is to provide a joint system for controlling maneuvering of the front wheels of the road vehicles.

Another object of the present invention is to provide a joint system that increases the maneuverability of the front wheels of the road vehicles.

Another object of the present invention is to provide a joint system that ensures that an angle between the rod arm and the rod bar is always maintained at a reliable value.

Still another object of the present invention is to provide a joint system which is reliable and easy-to-manufacture.

DESCRIPTION OF THE DRAWINGS

The illustrative embodiments of the joint system according to the present invention are illustrated in the enclosed drawings, in which.

Figure 1:
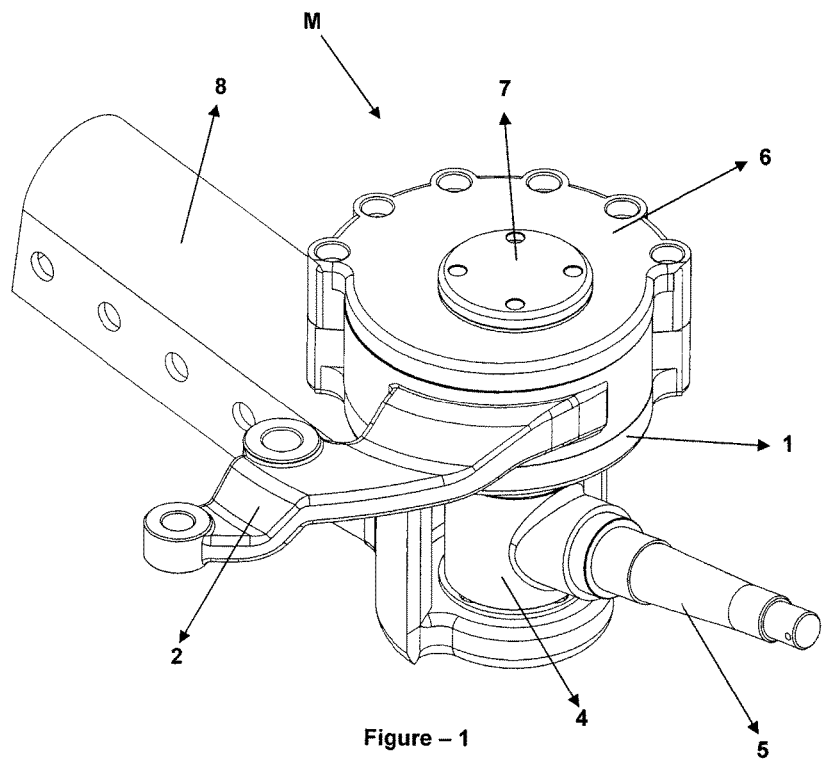
FIG. 1 is a perspective view of the joint system according to the present invention.

All the parts illustrated in the drawings are individually assigned a reference numeral and the corresponding terms of these numbers are listed as follows:

| | |
|---|---|
| Joint system | (M) |
| First rotation axis | (E1) |
| Second rotation axis | (E2) |
| Joint body | (1) |
| Connecting portion | (1a) |
| Bottom | (1b) |
| Body opening | (1d) |
| Rod arm | (2) |
| Rod arm body | (2a) |
| Arm | (2b) |
| Rod arm gear | (2c) |
| Eccentric bearing member | (3) |
| Stopper member | (3a) |
| Axle | (4) |
| Axle body | (4a) |
| Axle gear | (4b) |
| Axle space | (4c) |

-continued

| Wheel shaft | (5) |
| Cover | (6) |
| Connecting shaft | (7) |
| Retaining member | (7a) |
| Chassis connection | (8) |

DESCRIPTION OF THE INVENTION

The road vehicle maneuvers are generally performed by rotating the front wheels with respect to the chassis of the vehicle on an axis perpendicular to the floor. Said movement of the front wheels is achieved by means of joint systems comprising at least one rod arm that moves the wheels, at least one rod bar that moves the said rod arm, and at least one intermediate shaft that transmits the rotational movement of the steering wheel to the rod bar. In conventional joint systems, due to the fact that there is one-to-one movement transmission between the rod arm and the wheel, the wheel and the rod arm are rotated at the same extent. In order to move the rod arm in a reliable manner, the angle between the rod arm and the rod bar must be between a certain obtuse angle and a certain acute angle. Otherwise, such problems may arise as locking of the rod arm. Therefore, in conventional applications, the rotation angle of the rod arm and accordingly the rotation angle of the wheel are limited. With the present invention, there is provided a joint system wherein the movement transmission between the rod arm and the wheel is different from one-to-one so that the rotation angle of the wheel is increased.

Figure 2:
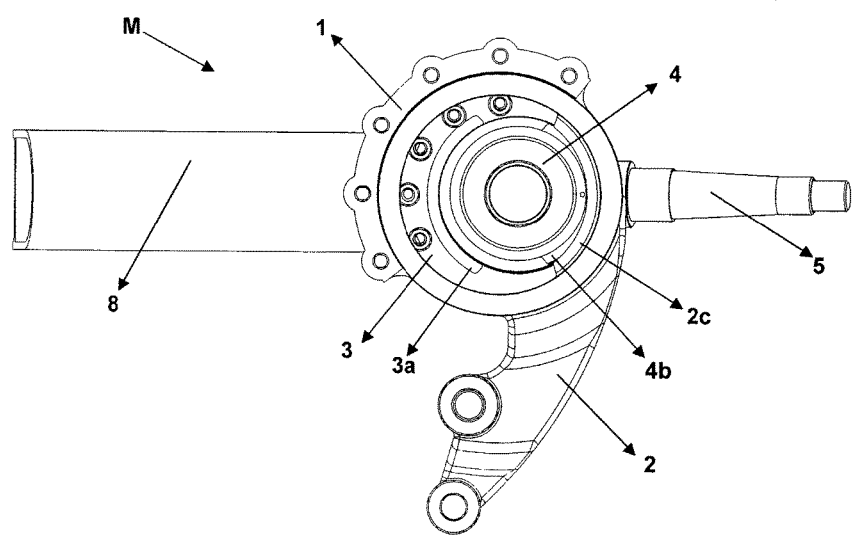
FIG. 2 is a top view of the joint system, with the cover removed according to the present invention.
Figure 3:
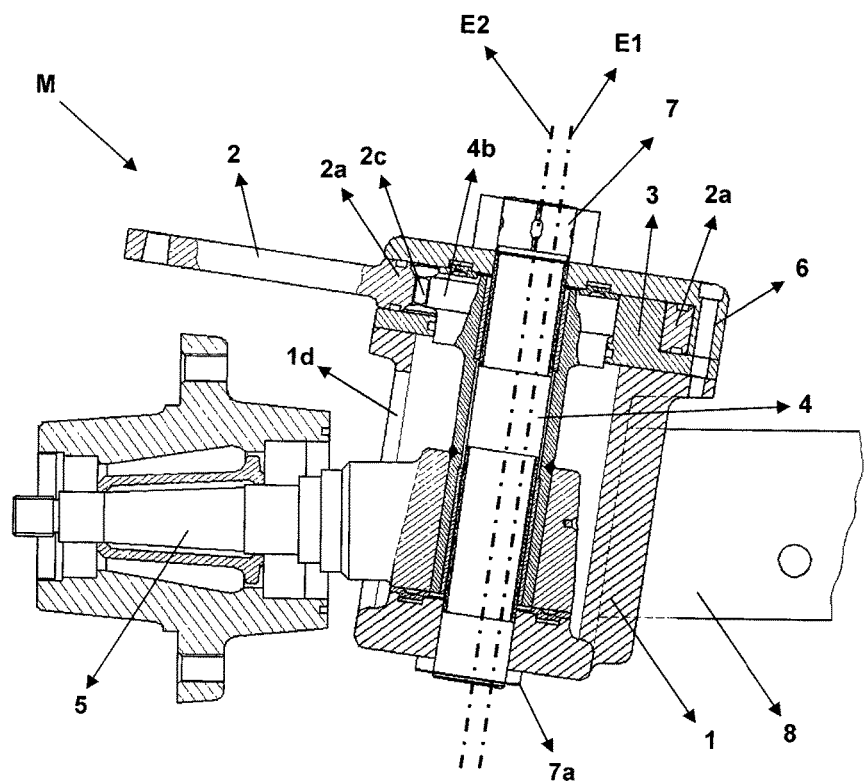
FIG. 3 is a side sectional view of the joint system according to the present invention.
Figure 4:
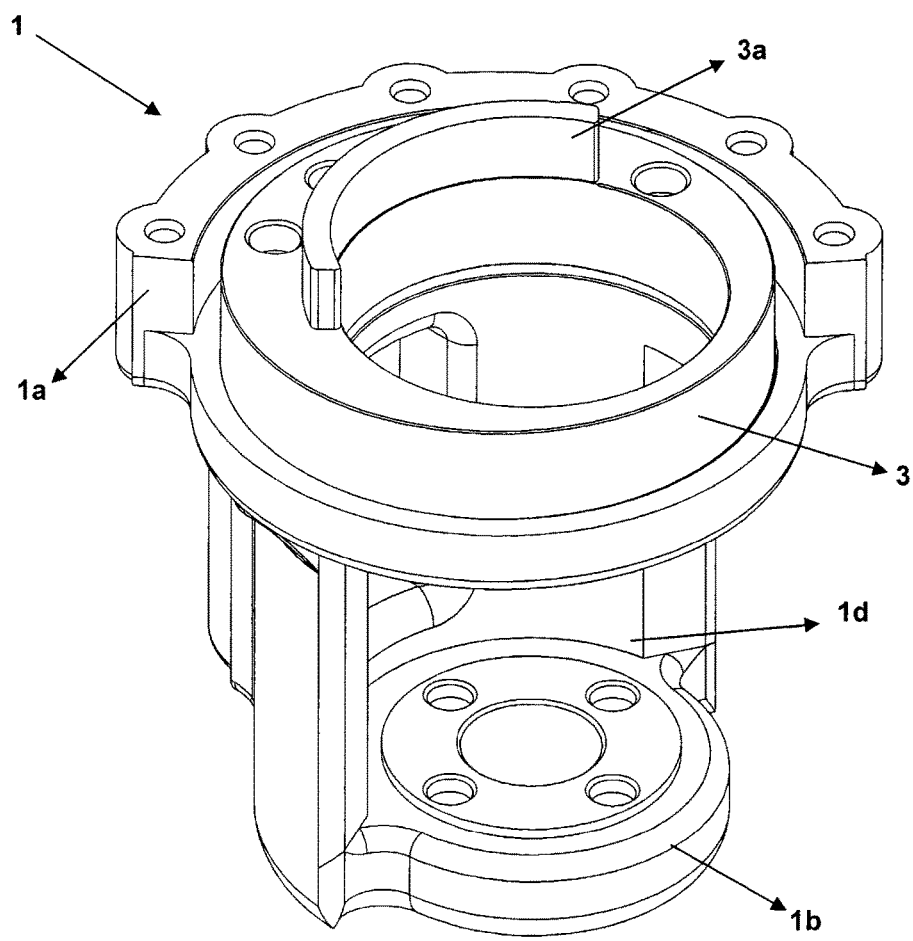
FIG. 4 is a perspective view of a body utilized in the joint system according to the present invention.
Figure 5:
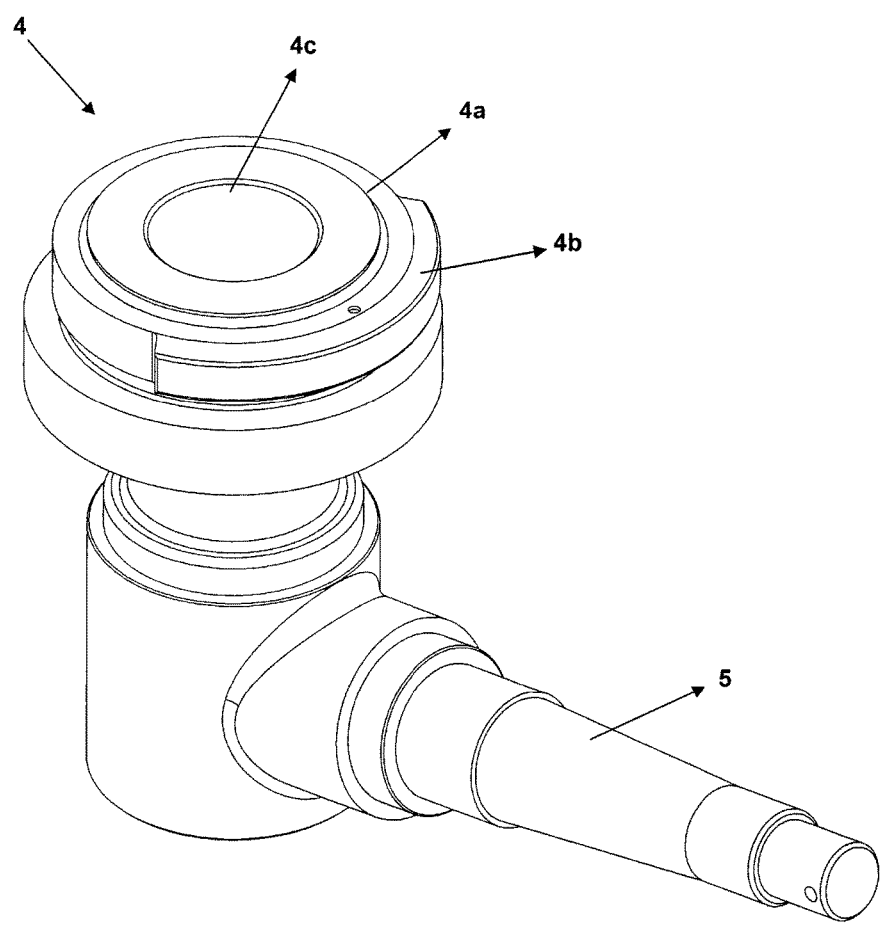
FIG. 5 is a perspective view of an axle utilized in the joint system according to the present invention.
Figure 6:
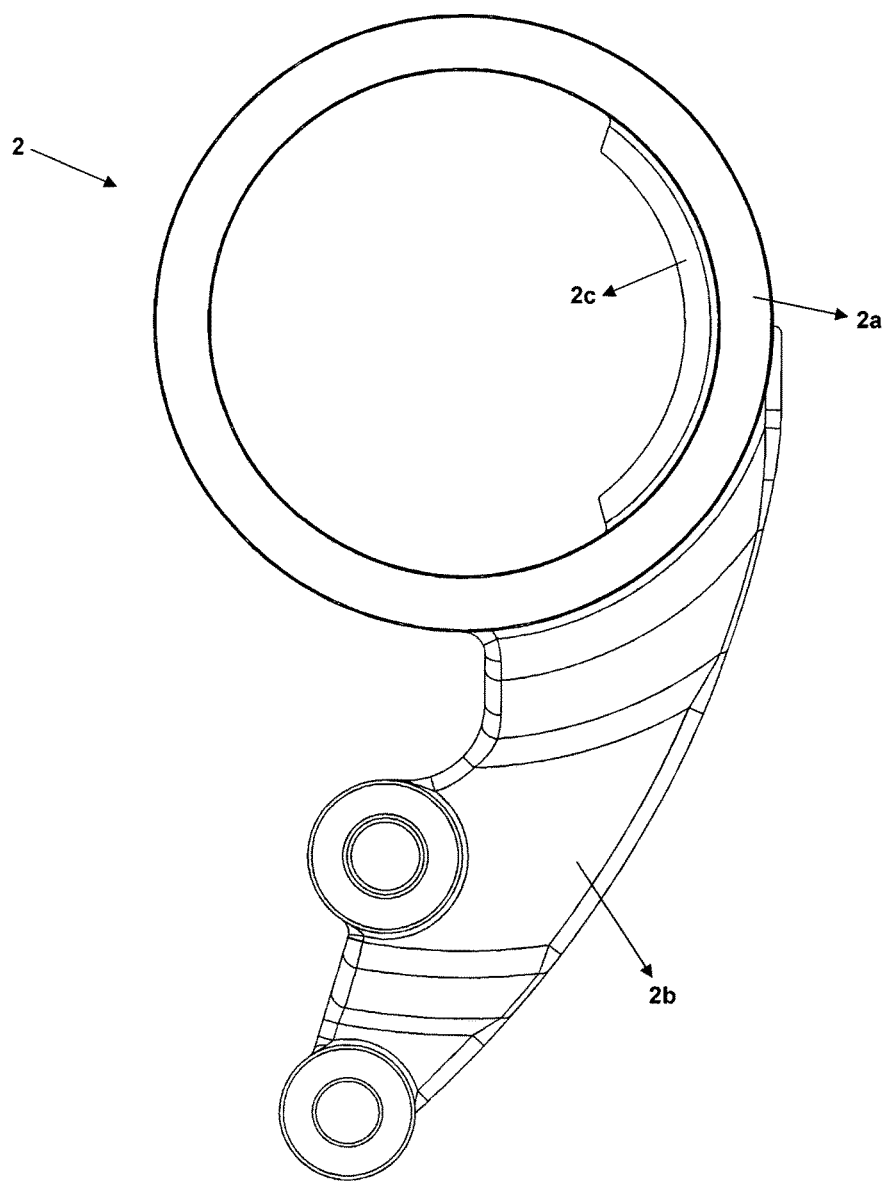
FIG. 6 is a perspective view of a rod arm utilized in the joint system according to the present invention.
Figure 7:
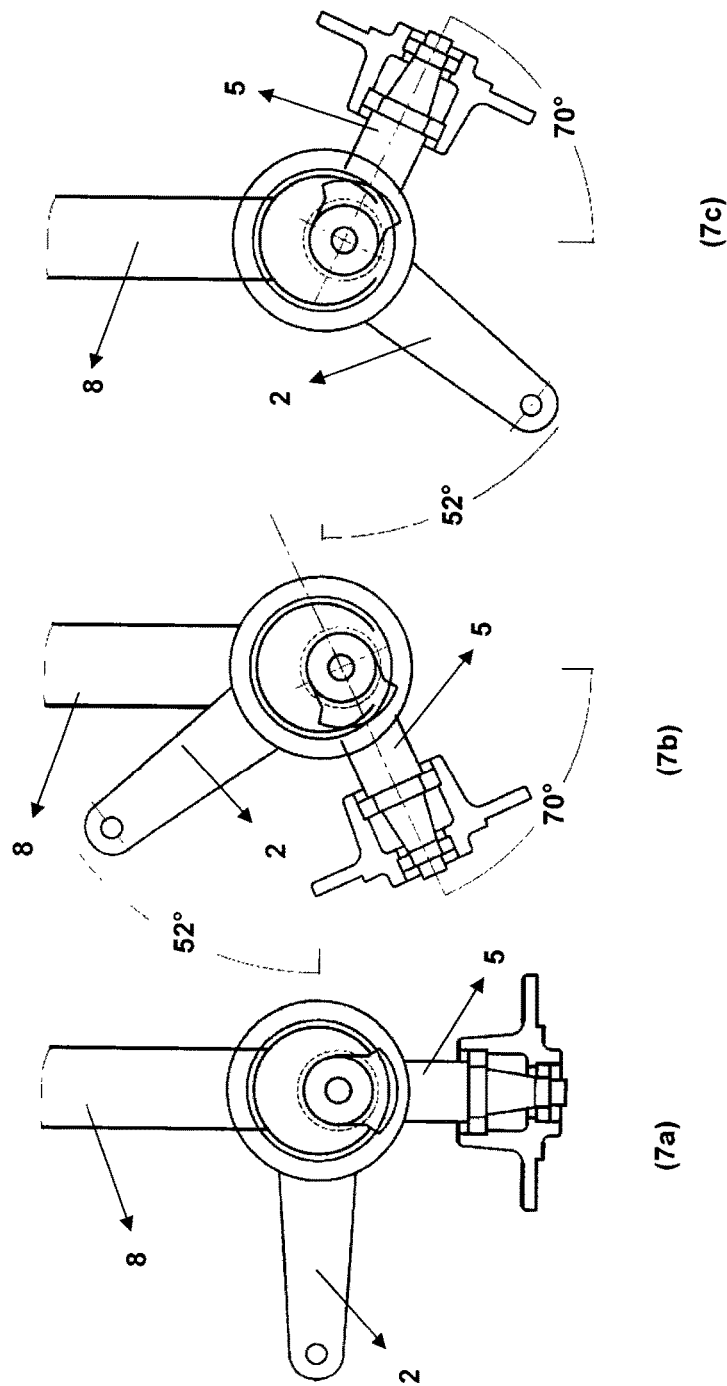
FIG. 7 is a top view showing movements of the joint system according to the present invention.

The joint system (M) according to the present invention, as illustrated in FIGS. 1-7, comprises at least one hollow (preferably cylindrical shaped) joint body (1) suitable for connecting to the chassis of a road vehicle by means of a chassis connection (8) and having at least one body opening (1d) on a side surface thereof; at least one rod arm (2) which has at least one rod arm body (2a) in the form of a ring, at least one arm (2b) protruding from the rod arm body (2a) and at least one rod arm gear (2c), in the form of a ring gear, located inside the rod arm body (2a), and which is connected to the said joint body (1) such that it is rotationally moved on a first rotation axis (E1); at least one eccentric bearing member (3) located in the joint body (1) and bearing the rod arm body (2a) in the joint body (1) such that it rotates on the said first rotation axis (E1); at least one axle (4) which is connected to at least one wheel shaft (5) extending outward from the said body opening (1d) and comprises at least one axle body (4a) which is located in the joint body (1) such that it rests on the bottom (1b) portion of the joint body (1) and rotates, in the joint body (1), on a second rotation axis (E2) (which is different from the first rotation axis (E1)) parallel to the said first rotation axis (E1) and at least one axle gear (4b) which is located on the said axle body (4a) and is in contact with the said rod arm gear (2c) that allows the rod arm (2) to rotate on the first rotation axis (E1) and the axle body (4a) to rotate on the second rotation axis (E2). Said eccentric bearing member (3) preferably has a cylindrical form so as to correspond to the rod arm body (2a) in the form of a ring. The eccentric bearing member (3) may either be integral with the joint body (1) or may be in the form of an external part that may be connected to the joint body (1) by means of at least one connecting member (not shown).

In an illustrative embodiment of the invention, the joint system (M) according to the present invention is used in a road vehicle so as to control at least one of the front wheels.

In this embodiment, the rod arm (2) is connected to a rod bar of a vehicle at an arm (2b) section thereof. A wheel is in turn connected to a wheel shaft (5). With the movement of the steering wheel of the road vehicle that is transmitted to the rod bar, the rod arm (2) is rotated on the said first rotation axis (E1). During the movement of the rod arm (2), an axle (4) connected to the rod arm gear (2c) through its axle gear (4b), the wheel shaft (5) connected to the axle (4) and the wheel connected to the wheel shaft (5) are rotated on the said second rotation axis (E2). Here, since the rod arm (2) and the axle (4) are rotated on different (eccentric) axes, a movement transmission which is not one-to-one, is achieved between the rod arm gear (2c) and the axle gear (4b). Since the number of teeth of the rod arm gear (2c) and that of the axle gear (4b) is changed, the movement transmission between the rod arm gear (2c) and the axle gear (4b) is maintained in the range of 1:1.1 to 1:1.5. In other words, in the joint system according to the present invention, the rod arm (2) is rotated by 60°, for example, so the axle (4) is rotated by 66° to 90°. In an illustrative embodiment shown in FIGS. 7 (7a, 7b and 7c), rotation of the rod arm (2) by 52° results in rotation of the axle (4) by 70°. Thus, even if the rotation axis of the rod arm (2) is maintained within a reliable range (for example, between the said obtuse angle and the acute angle), the axle (4) and the wheel shaft (5) connected to the axle (4) are rotated at the desired angle so that the maneuverability of the vehicle employing the joint system (M) is increased.

In a preferred embodiment of the invention, said rod arm gear (2c) is in the form of a ring gear part (i.e. a spring part that is internally threaded). Similar to the rod arm gear (2c) and in compliance with the rod arm gear (2c), also said axle gear (4b) is preferably in the form of a gear part (i.e. a spring part or spur gear that is externally threaded). Since the rod arm gear (2c) is a ring gear and the axle gear (4b) is a gear part, the rod arm (2) and the axle (4) are rotated in the same direction, unlike to the spur gear systems. Alignment of the said rod arm gear (2c) and the axle gear (4b) with respect to each other is of utmost importance. In this embodiment, the middle section of the rod arm gear (2c) and the axle gear (4b) must correspond to each other. Therefore, in this embodiment, the rod arm gear (2c) and the axle gear (4b) include at least one alignment mark positioned at the center thereof. Said alignment marks may be in the form of a recess, a protrusion or an imprint.

In another preferred embodiment of the invention, said eccentric bearing member (3) comprises at least one stopper member (3a) which contacts the rod arm gear (2c) during the rotational movement of the rod arm (2) on the first rotation axis (E1) so as to restrict the rotational movement of the rod arm (2). Said stopper member (3a) preferably protrudes from the eccentric bearing member (3) as a protrusion. In this embodiment, the stopper member (3a) ensures that the rod arm (2) is always maintained within a reliable rotation range, allowing the joint system (M) to have a reliable structure.

In another preferred embodiment of the invention, the joint system (M) comprises at least one cover (6) suitable for connecting to the joint body (1) such that the rod arm (2) is interposed between it and the joint body (1) (i.e. via the rod arm (2)). In this embodiment, the joint body (1) comprises at least one connecting portion (1a) for connecting the said cover (6). In the said joint system (M), there are at least two connecting holes, at least one being located on the connecting portion (1a) and at least another being located on the cover (6). A connecting member (not shown) such as a screw is inserted through the said connecting holes so as to connect the cover (6) to the joint body (1). In this embodiment, said connecting members may not ensure that the joint body (1) and the cover (6) are connected in a sufficiently robust manner. Therefore, the joint system (M) according to the present invention also comprises at least one connecting shaft (7), at least one side of which located on the said cover (6), which is passed through the said joint body (1) and through at least one axle space (4c) provided in the axle (4), and at least another side of which protrudes from the bottom (1b) of the joint body (1), and at a side of which protruding from the bottom (1b) of the joint body (1), at least one retaining member (7a) is connected, and which bears the axle (4) in the joint body (1). Said connecting shaft (7) is preferably in the form of a pivot pin or a screw and said retaining member (7a) is in the form of a nut. In this embodiment, since a side of the said connecting shaft (7) is connected to the retaining member (7a) by being passed through the cover, the joint body (1), the axle space (4c) and said bottom (1b), a non-flexible rigid (i.e. a more robust) connection between the joint body (1) and the cover (6) is achieved.

In another preferred embodiment of the invention, the joint system (M) comprises at least one protective member (not shown) which covers the holes on the said body opening (1d), except the wheel shaft (5), and which is preferably moved along with the axle (4). Said protective member prevents any foreign substances such as stone, soil etc. from entering into the joint body (1) through the body opening (1d). Thus, the joint body (1) and the axle (4) moving inside the joint body (1) are prevented from being damaged.

In another embodiment of the invention, the joint system (M) comprises at least one sealing member (e.g. a heat-resistant and friction-resistant seal) positioned between the rod arm (2) and the joint body (1), the rod arm (2) and the cover (6) and/or the rod arm (2) and the axle (4). In this embodiment, when the connection between the rod arm (2) and the axle (4) is lubricated, said sealing member prevents oil from leaking outside. In this manner, a more durable lubrication is achieved.

In the joint system (M) according to the present invention, since the rod arm (2) and the axle (4) are moved on different rotation axes (E1, E2) and the number of teeth of the rod arm gear (2c) and that of the axle gear (4b) is adjusted, the rod arm (2) and the axle (4) are rotated at varying degrees. Thus, the rotation angle of the axle (4), the wheel shaft (5) connected to the axle (4) and a wheel connected to the wheel shaft is prevented from being restricted by the rotation angle of the rod arm (2), so that the maneuverability of the road vehicle employing the joint system (M) is increased.

The invention claimed is:

1. A joint system (M) for controlling maneuvering of front wheels of a road vehicle, comprising;
    at least one hollow joint body (1) suitable for connecting to a chassis of the road vehicle by means of a chassis connection (8) and having at least one body opening (1d) on a side surface thereof;
    at least one rod arm (2) which has at least one rod arm body (2a) in the form of a ring, at least one arm (2b) protruding from the rod arm body (2a) and at least one rod arm gear (2c), in the form of a ring gear part, located inside the rod arm body (2a), and which is connected to the said joint body (1) such that the at least one rod arm (2) is rotationally moved on a first rotation axis (E1);
    at least one eccentric bearing member (3) located in the joint body (1) and bearing the rod arm body (2a) in the joint body (1) such that the at least one eccentric bearing member (3) rotates on the said first rotation axis (E1);
    at least one axle (4) which is connected to at least one wheel shaft (5) extending outward from the said body opening (1d) and comprises at least one axle body (4a) which is located in the joint body (1) such that the at least one axle (4) rests on the bottom (1b) portion of the joint body (1) and rotates, in the joint body (1), on a second rotation axis (E2) parallel to the said first rotation axis (E1) and at least one axle gear (4b) which is located on the said axle body (4a) and is in contact with the said rod arm gear (2c) that allows the rod arm (2) to rotate on the first rotation axis (E1) and the axle body (4a) to rotate on the second rotation axis (E2)
    characterized in that said eccentric bearing member (3) comprises at least one stopper member (3a) which contacts the rod arm gear (2c) during the rotational movement of the rod arm (2) on the first rotation axis (E1) so as to restrict the rotational movement of the rod arm (2).

2. The joint system (M) according to claim 1, characterized in that said joint body (1) has a cylindrical shape.

3. The joint system (M) according to claim 1, characterized in that the eccentric bearing member (3) has a cylindrical shape.

4. The joint system (M) according to claim 1, characterized in that the eccentric bearing member (3) is integral with the joint body (1).

5. The joint system (M) according to claim 1, characterized in that the eccentric bearing member (3) is in the form of an external part which is connected to the joint body (1) by means of at least one connecting member.

6. The joint system (M) according to claim 1, characterized in that said axle gear (4b) is in the form of a gear part.

7. The joint system (M) according to claim 1, characterized by comprising at least one cover (6) suitable for connecting to the joint body (1) such that the rod arm (2) is interposed between it and the joint body (1).

8. The joint system (M) according to claim 7, characterized in that the joint body (1) comprises at least one connecting portion (1a) for connecting the said cover (6).

9. The joint system (M) according to claim 8, characterized by comprising at least two connection holes, at least one being located on the connecting portion (1a) and at least another being located on the cover (6).

10. The joint system (M) according to claim 7, characterized by comprising at least one connecting shaft (7), at least one side of which is located on the said cover (6), which is passed through the said joint body (1) and through at least one axle space (4c) provided in the axle (4), and at least another side of which protrudes from the bottom (1b) of the joint body (1), and at a side of which protruding from the bottom (1b) of the joint body (1), at least one retaining member (7a) is connected, and which bears the axle (4) in the joint body (1).

* * * * *